J. E. THORNTON.
PHOTOGRAPHIC PRINTING PROCESS.
APPLICATION FILED SEPT. 13, 1918.
1,360,156. Patented Nov. 23, 1920.
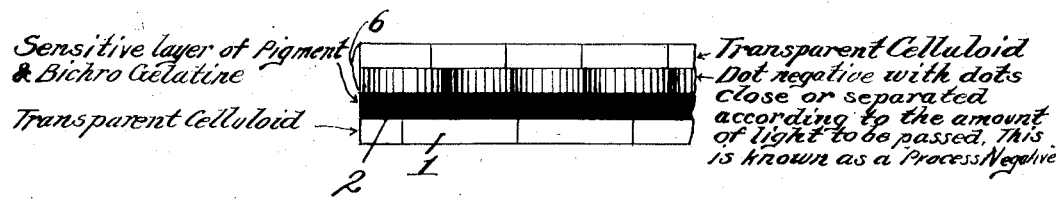
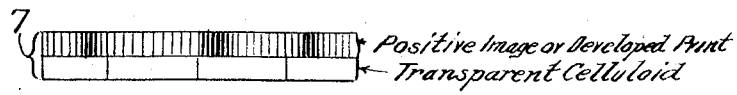
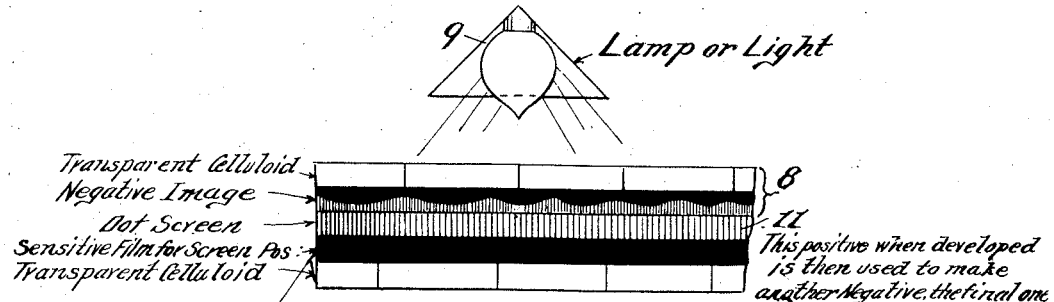
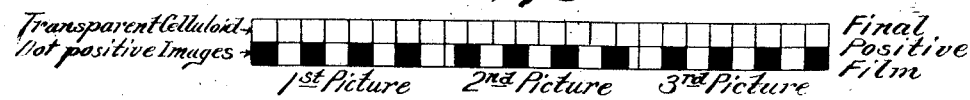
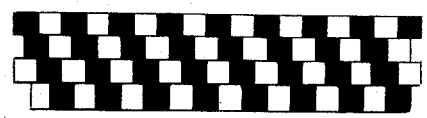
Witness
Inventor
John Edward Thornton
By
Attorney

UNITED STATES PATENT OFFICE.

JOHN EDWARD THORNTON, OF WEST HAMPSTEAD, LONDON, ENGLAND, ASSIGNOR TO JOHN OWDEN O'BRIEN, OF MANCHESTER, ENGLAND.

PHOTOGRAPHIC-PRINTING PROCESS.

1,360,156.  Specification of Letters Patent.  Patented Nov. 23, 1920.

Original application filed June 30, 1915, Serial No. 37,323. Divided and this application filed September 13, 1918. Serial No. 253,969.

*To all whom it may concern:*

Be it known that I, JOHN EDWARD THORNTON, a British subject, residing at West Hampstead, London, England, have invented certain new and useful Improvements in and Relating to Photographic - Printing Processes, of which the following is a specification.

This invention relates to the manufacture or production of transparent cinematograph films.

In my prior Patent No. 1,288,753, granted December 24, 1918 and of which this application is a division, I have described a method of manufacture in which the image of the successive pictures on the cinematograph film is broken up into or composed of a large number of screen markings of very fine dots and which when magnified by projection will show a grainy image on the screen, which on account of the enlargement would be very pronounced.

The object of this invention is to produce a transparent cinematograph film in which the color pattern of lines, dots or grain is rendered invisible or their appearance reduced to a minimum and which by the law of persistence of vision will give to the observer when projected in succession on a screen the impression of full tone grainless pictures.

It consists in disposing the dots, lines or grains in a different position or varying the position of the dots, lines or grains on the corresponding part of the image on each succeeding picture of the series throughout the length of the film, whereby when the pictures are projected in rapid succession upon a screen the different position of the dots, lines or grains of which the picture is composed, and the persistence of vision of the observer, will obliterate the appearance of dots lines or grains, and give to the observer the impression of full tone or grainless pictures.

The invention will be equally applicable to monocolor pictures printed at one exposure or impression or to multi-color pictures printed superimposed at two or more exposures or impressions.

In the printing of cinematograph films, it is necessary to provide a negative each picture of the series thereon being printed through the intervention of a screen which breaks the picture up into a number of dots lines or grains, and in the ordinary way of production each dot line or grain produced by the screen would in each succeeding picture occupy a corresponding position on the image.

Now by this invention in producing the negative as each picture is successively produced the interposed screen is moved a slight distance in one direction or another, so that while the picture images remain relatively unmoved the screen markings of dots lines or grains which comprise the image vary in relative position from one picture to the next, thereby giving the result desired.

In the accompanying drawing:—

Figure 1 is a diagrammatic view showing a method of producing a positive print from a dot negative;

Fig. 2 represents a cross section of a print obtained from the dot negative;

Fig. 3 is a diagrammatic view showing a method of obtaining a dot negative such as that shown in Fig. 1;

Fig. 4 is a diagrammatic view showing a method of arranging the dots in different positions in the successive pictures of the final print; and Fig. 5 is a diagrammatic view showing the relative positions of the dots of the pictures when projected in succession upon a screen.

In carrying out the invention according to the preferred procedure, the film, or other support 1, is first coated with a sensitized colloid 2, such as gelatin, in which pigment or the desired dye has been incorporated.

The sensitized film is exposed from the front for the requisite period of time to print through to the base, under a screen printing negative 6 of a special type hereinafter described, then developed, washed and dried. If the colloid be gelatin, hot water is used for development. The development is rendered capable of accomplishment from the front of the sensitized colloid 2 (Fig. 1) and a sharp carbon print thus obtained because of the breaking up of the image into a large number of very fine dots, by the use of a screen printing negative, known as a "process negative" in which the image is composed of a similar number of small dots or lines, such negatives being used in half-tone block making and other well known mechanical processes.

Fig. 1 shows diagrammatically the negative 6 in printing relation to the sensitized and colored colloid, and Fig. 2 represents in section the print 7 obtained by exposure thereof through such a negative, the said print being composed of dots all of the same height and depth but varying in their closeness in inverse ratio to that of the negative and the whole of the dots composing the image are insoluble from back to front, the soluble points having been dissolved and washed away during development.

The screen printing negative used is made preferably, as shown diagrammatically in Fig. 3, by placing a continuous tone positive cinematograph film 8 made by contact from the original continuous tone negative from a powerful light 9 opposite to which is placed a sensitive silver bromide film 10. The two films 8 and 10 are placed opposite to each other with a dot screen 11 interposed between them. Upon developing the sensitive film so exposed the screen negative 6 will result, it bearing a series of images which are counterparts of the originals, except that they consist of dots or grain varying in sizes and closeness, thus producing a picture in broken tones instead of continuous tones, and this film may be used as a negative for producing the required cinematograph films.

A cinematograph film produced as described will, when magnified by projection, show a grainy image on the screen, but I reduce this effect to a minimum by shifting the ruled screen slightly between the exposure of successive pictures when making the reproduced grainy or screen printing negative, as shown diagrammatically in Fig. 4.

When the cinematograph film is so printed or reproduced from the printing negative such dots, lines or grains will be projected on the screen substantially as represented diagrammatically in Fig. 5, and this in conjunction with their momentary presence upon the screen will render these dots, lines or grains invisible to the eye of the observer through the persistence of vision giving the impression of a full tone grainless picture.

To produce multi-colored transparent films, two or more negatives are prepared—one for each color—with the dots, lines or grains therein in a different position relative to the image in each succeeding picture longitudinally of the film, in the manner hereinbefore described, and from these negatives the transparent film is printed by successive exposures or impressions in different colors superimposed one upon the other.

What I claim as my invention and desire to protect by Letters Patent is:—

1. In the production of printed transparent cinematograph films in which the images are composed of a pattern of dots lines or grains, the method of rendering the pattern invisible to the eye of the observer when the pictures are projected in succession upon a screen, which comprises varying the position of and disposing of the dots lines or grains in a different position relative to the image in each succeeding picture of the series longitudinally of the film, whereby when such pictures are projected in rapid succession upon a screen the different position of the dots, their momentary presence on the screen and persistence of vision of the observer will give to the observer the impression of grainless full tone pictures.

2. In the process of producing transparent cinematograph films with a grained surface through a screen printing negative, moving or altering the screen during the production of the screen negative after each successive exposure to vary the position of the screen markings in relation to the picture image and dispose them differently in a direction longitudinally of the film in each successive picture of the series in order to remove the "grainy" effect from the picture and render the dots lines or grains invisible to the eye of the observer when the series of pictures are projected on to a screen from a lantern.

3. A transparent cinematograph film having a series of pictures printed thereon in dots lines or grains, such dots lines or grains varying in relative position in relation to the picture image in each succeeding picture of the series longitudinally of the film.

4. A transparent cinematograph film having a series of multicolor pictures thereon composed of a plurality of printings and colors, each represented in dots lines or grains of colored material, the said dots lines or grains being placed in different relative positions in relation to the picture image for each succeeding picture of the series.

In testimony whereof I have hereunto set my hand in presence of two subscribing witnesses.

JOHN EDWARD THORNTON.

Witnesses:
J. OWDEN O'BRIEN,
GEO. H. O'BRIEN.